Oct. 16, 1951      W. A. ORLOWSKY      2,571,751
LOADING AND UNLOADING ATTACHMENT FOR AUTOMOTIVE VEHICLES
Filed Dec. 17, 1946      2 SHEETS—SHEET 2
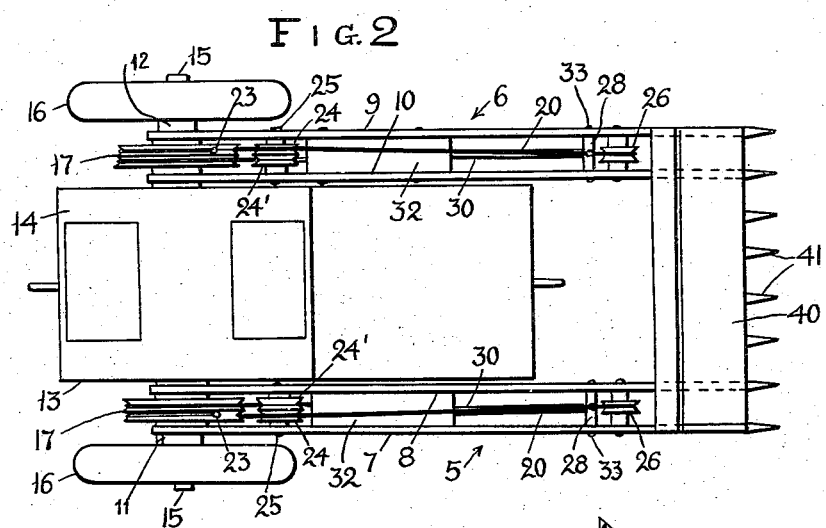
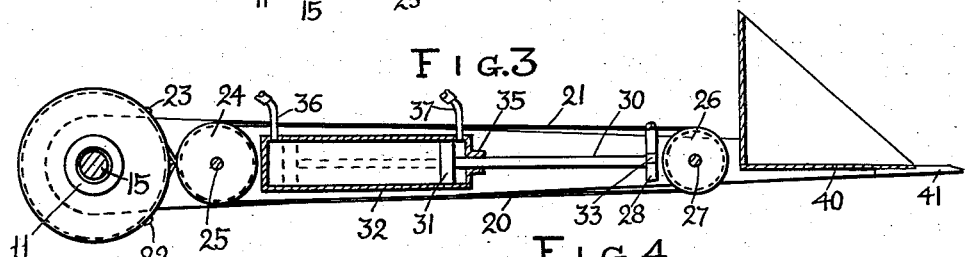
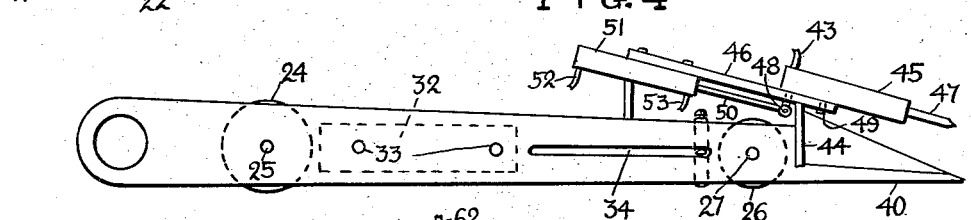
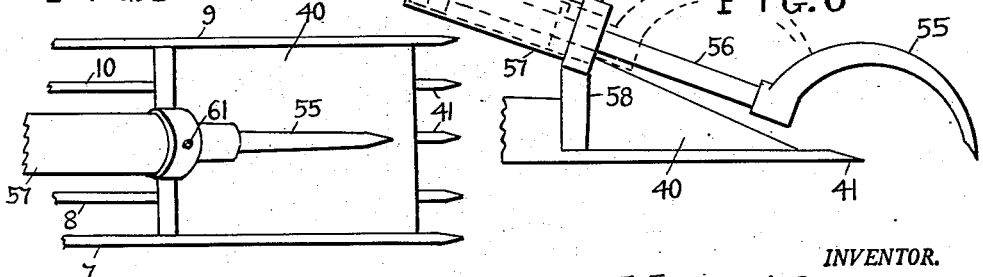
INVENTOR.
WASSYL A. ORLOWSKY
BY
ATTORNEY

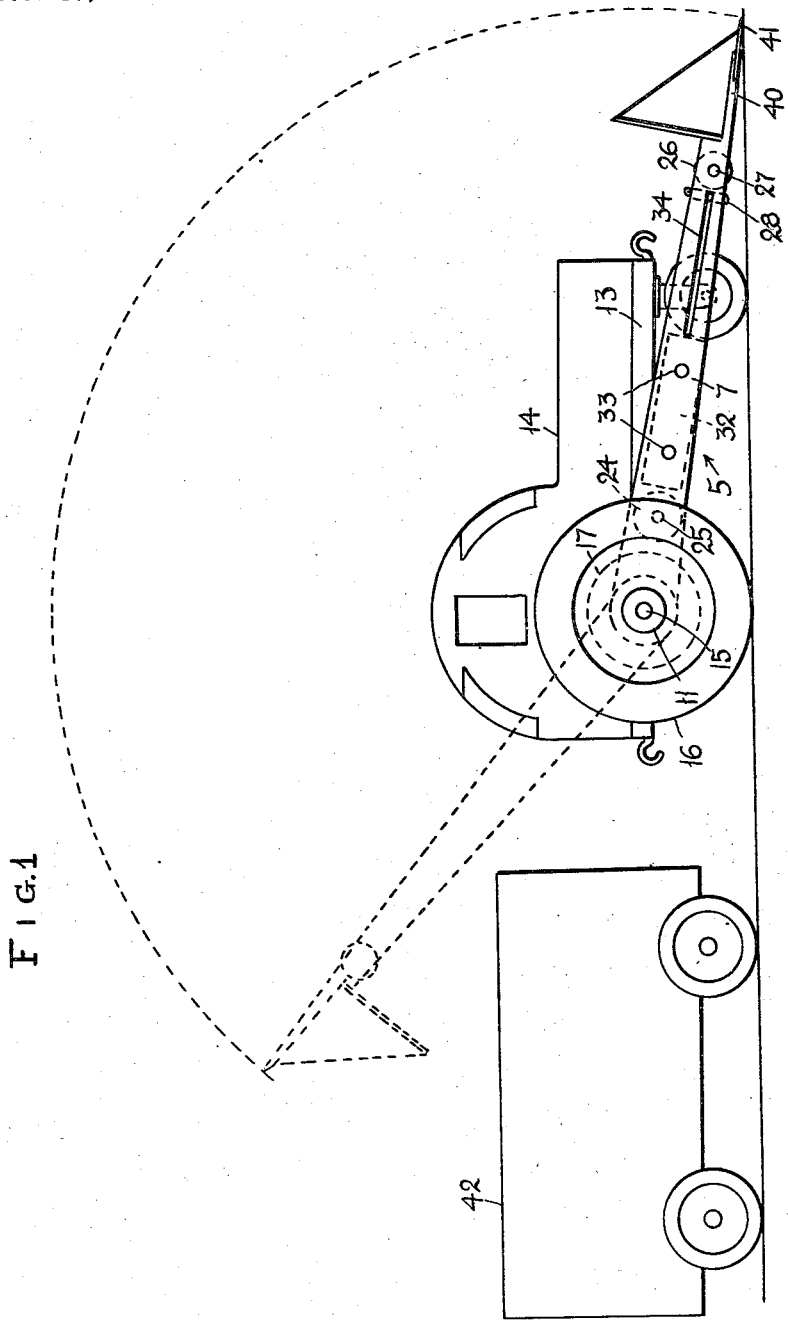

UNITED STATES PATENT OFFICE 2,571,751

LOADING AND UNLOADING ATTACHMENT FOR AUTOMOTIVE VEHICLES

Wassyl A. Orlowsky, New York, N. Y.

Application December 17, 1946, Serial No. 716,788

6 Claims. (Cl. 214—131)

My invention relates to loading and unloading attachments for automotive vehicles and has particular reference to attachments of a shovel type for handling materials in bulk.

My invention has for its object to provide an attachment for power-operated vehicles which can be used for transferring definite loads of a bulky material from the front of the vehicle to its rear or vice versa, as for instance, for gathering coal, stone, sand, etc. in front of a truck or tractor, and transferring this material to the rear of the truck or tractor into another vehicle such as a dump truck or a conveyor for moving the material away.

An allied object of my invention is to provide a loading and unloading attachment which will transfer the material in a swinging rotary movement over the top of the vehicle so that the vehicle being loaded can be placed directly behind the loading and unloading vehicle, on the same track. Thus, considerable saving in space can be effected since the loading device at no time extends to the sides of the loading vehicle.

Another allied object of my invention is to provide a simple and effective loading device in which the motor which operates the loader, whether hydraulic, pneumatic, or electric is placed directly on the swinging arms which carry the loading shovel or similar material handling device, thus greatly simplifying the design and making it possible to obtain a large arc of movement for the swinging arms with sufficient power to lift relatively heavy loads.

Another object of my invention is to provide means to unload cars by using my loading attachment.

Another object of my invention is to provide a loading attachment having elements, preferably power operated, for breaking up the material to be loaded into lumps prior to gathering the same into the loading shovel or bucket. Such material breaking elements may consist of auxiliary hydraulic, pneumatic or electric hammers or drills, or any movably mounted claws which can be operated by swinging the loading arms up and down, and which can be retracted upon completion of the breaking operation for exposing the material handling shovel.

Fig. 1 is an elevational view of a tractor equipped with my loading attachment for transferring a load from in front of the tractor into a truck or car back of the tractor;

Fig. 2 is a top plan view of the same;

Fig. 3 is a sectional detail view of a swinging arm forming a part of my loading attachment;

Fig. 4 is an elevational view of the swinging arm with an air hammer;

Fig. 5 is a fractional top plan view of a shovel used in my attachment provided also with a material breaking claw; and Fig. 6 is a side view of the same.

My loading attachment as shown in Figs. 1 to 3 inclusive comprises a pair of arms generally indicated by numerals 5 and 6, each arm consisting of members 7, 8 and 9, 10 respectively. The arm members are rotatively mounted at their inner ends on tubular extensions or projections 11, 12 at the sides of a chassis frame 13 of a tractor 14, the tubular projections forming bearings for a rear axle 15 supporting driving wheels 16 at the ends. Pulleys 17 are rigidly mounted on the extensions 11, 12 between the respective arm members 7, 8 and 9, 10. Cables or similar flexible members 20, 21 are wound on the pulleys, each cable in its own groove. The ends of the cables are secured to the respective pulleys at 22, 23. The other ends of the cables 20, 21 cross each other and pass over idler pulleys 24, 24' rotatively supported between the arm members on a shaft 25. The outer end of the lower cable 20 passes over another idler pulley 26 rotatively mounted on a shaft 27 and is connected to the upper end of a block 28. The outer end of the other cable 21 is also connected to the block 28. The latter is mounted at the end of a rod 30 extending from a piston 31 sliding in a hydraulic cylinder 32. Lugs 33 extend from the sides of the block 28 and slide in elongated slots 34 in the arm members. The cylinder 32 is closed at both ends, the rod 30 passing through a packing gland 35. Pipes 36, 37 extend from the ends of the cylinder and are connected by suitable flexible pipes to a source of a fluid under pressure through a suitable control valve. Thus, it is possible selectively to admit the fluid into the front or rear portion of the cylinder thereby causing the piston to move forward or rearward. It is evident that the rearward movement of the piston will pull the cable 20 forward and will at the same time release the cable 21, thereby producing a turning moment at the pulley 17 and causing the arm to be raised. Conversely, the forward movement of the piston will cause the arm to swing downward.

It is obvious that chains can be also used with sprockets instead of the cables and pulleys. The outer ends of the arms 5, 6 are connected together by a shovel 40 having sharp teeth 41 at the front for biting into a mass of material to be handled such as coal, sand, earth, ore, etc. The shovel may be of any suitable type including a self-opening type.

In the operation of the tractor or truck equipped with my attachment, the truck is moved forward until the shovel digs into the material being handled. Compressed fluid is then admitted into the front portions of the cylinders 32, thereby raising the arms with the shovel. The movement will continue as shown in dotted lines in an arcuate path over the top of the tractor until the shovel reaches an open car or truck 42 in an inverted position, discharging its contents into the car or truck. The flow of the fluid is then reversed, admitting the fluid into the rear ends of the cylinders 32 and exhausting from the front ends, thereby reversing the rotation of the arms to return the shovel into its original position in front of the tractor. The latter may be advanced to cause the shovel to be loaded with the material being handled.

The truck or tractor may be of any suitable type operated by an internal combustion engine, steam, or electricity, etc., mounted on wheels or creeper chains of a "Caterpillar" type.

For handling a material which occurs in a more or less solid mass, such as coal, stone, ore, etc., which has not been previously broken up into smaller lumps, my attachment can be provided with an additional means to break the material into lumps. Such an arrangement is shown in Fig. 4 and consists of a supplementary air or electric hammer or drill 45 connected by a pipe 43 slidably mounted on an inclined rail 46 supported on a bracket 44 so that a bit 47 of the hammer can engage the mass of material in front of the shovel. The hammer is provided with lugs 48, 49 sliding in a slot of the rail 46. The lug 48 is connected to one end of a rod 50 whose other end connects to a piston in a hydraulic cylinder 51. The latter is connected by pipes 52, 53 to a source of a fluid under pressure through a suitable control valve. Thus, the air hammer can be moved rearward when its work is completed, freeing the shovel for gathering the broken material and advanced again for breaking up a new layer of the material.

Another modification is shown in Figs. 5 and 6. A curved claw 55 is mounted at the end of a rod 56 sliding in a hydraulic cylinder 57 supported on a bracket 58, the inner end of the rod 56 being connected to a piston 59 in the cylinder 57. Pipes 61, 62 at the ends of the cylinder 58 are connected by suitable flexible tubes and through a suitable valve to a source of compressed fluid for causing the piston to move the claw forward or to retrieve it. With the claw advanced in front of the shovel, the claw can be used as a hammer or pickax for breaking the material. The arm for this purpose is moved alternately up or down by alternately admitting the compressed fluid into the front or rear portions of the cylinders 32.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

The following is claimed as new:

1. A loading attachment for an automotive vehicle having wheels and a chassis frame, comprising in combination therewith, projections at the sides of the frame; a pulley rigidly mounted on each projection; an arm rotatively mounted at its inner end on each projection; a reversible motor mounted on each arm adapted to be controlled from the driver's seat on the vehicle; a cross member adapted to handle materials mounted on the outer ends of the arms; and an operative connection between each motor and the peripheral portion of the pulley comprising two cables having the inner ends thereof secured to the pulley and the outer ends thereof secured to the reversible motor for producing a tangential pull on the pulley when the motors are energized for movement in one or the other direction, thereby causing the arms with the cross member to rotate on the projections in one or the other direction, the arms being sufficiently long to move the cross member from the position in front of one end of the vehicle to the position in front of the other end of the vehicle.

2. A loading attachment for an automotive vehicle having wheels and a chassis frame, comprising in combination therewith projections at the sides of the frame; a pulley rigidly mounted on each projection; an arm rotatively mounted at its inner end on each projection; a hydraulic cylinder mounted on each arm; a plunger in the cylinder; means to admit a fluid under pressure into each cylinder at one or the other side of the plunger; operative connections between each plunger and the peripheral portion of the corresponding pulley comprising two cables having the inner ends thereof secured to the pulley and the outer ends thereof secured to the plunger for causing the arms to rotate on the extensions in one or the other direction when the fluid is admitted to one or the other side of the plungers; and a shovel-like member mounted at the ends of the arms.

3. A loading attachment for an automotive vehicle having axles with wheels and a chassis frame, comprising in combination therewith, tubular projections at the sides of the frame concentric to one of the axles; a pulley rigidly mounted on each projection; an arm rotatively mounted at its inner end on each projection; a hydraulic cylinder mounted lengthwise on each arm; a plunger slidably mounted in each cylinder; a rod extending from each plunger; a block at the end of the rod slidably supported on the respective arm; an idler pulley at the outer end of each arm; a flexible member extending between the pulleys on each arm, one end portion of the flexible member being wound about the idler pulley and secured to the corresponding block, the other end portion of the flexible member being wound about the corresponding rigidly mounted pulley with the end of the flexible member secured thereto; a second flexible member on each arm having one end portion wound on the corresponding rigidly mounted pulley in a direction opposite to the direction of the first flexible member and having its end secured to the rigidly mounted pulley, the other end of the second flexible member being secured to the corresponding block; a material handling member mounted at the outer ends of the arms; and means to admit a fluid under pressure into the cylinders for moving the pistons thereby moving the flexible members and causing the arms to rotate.

4. An automotive vehicle having a chassis frame supported on wheels, comprising in combination therewith a projection at each side of the frame; a pulley rigidly mounted on each projection; an arm rotatively mounted at its inner end on each projection; a material handling member mounted on the outer ends of the arms; a pair of flexible members engaging each pulley, the inner ends of the flexible members being secured thereto; an idler pulley at the outer end of each arm for the intermediate portion of each of the flexible members; a hydraulic cylinder mounted lengthwise on each arm; a piston in the cylinder; a rod extending from the piston, the outer end of the rod being connected to the outer ends of the flexible members; and means to supply a fluid under pressure into the cylinders for causing the pistons to move the flexible members thereby causing the arms to rotate about the respective projections.

5. A loading attachment for an automotive vehicle having wheels and a chassis frame, comprising in combination therewith, projections at the sides of the frame; a pulley rigidly mounted on each projection; an arm rotatively mounted at its inner end on each projection; flexible members wound on each rigidly mounted pulley, the inner ends of the flexible members being secured thereto; idler pulleys rotatively supported on each arm near the periphery of the rigidly mounted pulley, the flexible members crossing each other between the idler and rigidly mounted pulleys and passing over the pulleys toward the outer portions of the arm; an outer idler pulley rotatively mounted at the outer end of each arm, one of the flexible members passing over the outer pulley; a block slidably supported on each arm, the outer ends of the flexible members being connected to the block; and means on each arm to move the block thereby producing a turning moment on the arms for causing the arms to rotate about the common axis of the projections.

6. A loading attachment for an automotive vehicle having wheels and a chassis frame, comprising in combination therewith, projections at the sides of the frame; a pulley rigidly mounted on each projection; an arm rotatively mounted at its inner end on each projection; flexible members wound on each rigidly mounted pulley, the inner ends of the flexible members being secured thereto; idler pulleys rotatively supported on each arm near the periphery of the rigidly mounted pulley, the flexible members crossing each other between the idler and rigidly mounted pulleys and passing over the pulleys toward the outer portion of the arm; an outer idler pulley rotatively mounted at the outer end of each arm, one of the flexible members passing over the outer pulley; a block slidably supported on each arm, the outer ends of the flexible members being connected to the block; a hydraulic cylinder mounted lengthwise on each arm; a piston in the cylinder; a rod extending from the piston, the outer end of each rod being connected to the respective block; and means to supply a fluid under pressure into the cylinders for causing each piston with its rod and block to move the flexible members thereby causing the arms to rotate about the common axis of the projections.

WASSYL A. ORLOWSKY.

REFERENCES CITED

The following references are of record in the file of this patent:

UNITED STATES PATENTS

| Number | Name | Date |
|---|---|---|
| 105,883 | Bailey | Aug. 2, 1870 |
| 937,283 | Cadwell et al. | Oct. 19, 1909 |
| 1,067,375 | Proctor | July 15, 1913 |
| 2,056,495 | Venema | Oct. 6, 1936 |
| 2,227,624 | Benbow et al. | Jan. 7, 1941 |
| 2,286,723 | Frost | June 16, 1942 |
| 2,296,827 | Andersen et al. | Sept. 29, 1942 |
| 2,332,962 | Barrett | Oct. 26, 1943 |
| 2,362,407 | Ruddock | Nov. 7, 1944 |
| 2,418,251 | Drott | Apr. 1, 1947 |
| 2,427,461 | Johnson | Sept. 16, 1947 |
| 2,427,968 | Hoover | Sept. 23, 1947 |